United States Patent [19]

Wu

[11] Patent Number: 6,136,877
[45] Date of Patent: Oct. 24, 2000

[54] 142B/124 BLOWING AGENT BLENDS

[75] Inventor: Jinhuang Wu, Upper Merion, Pa.

[73] Assignee: Elf Atochem North America, Inc., Philadelphia, Pa.

[21] Appl. No.: 09/372,499

[22] Filed: Aug. 11, 1999

Related U.S. Application Data

[62] Division of application No. 09/277,060, Mar. 26, 1999, abandoned.

[51] Int. Cl.$^7$ .................................................. C08J 9/14
[52] U.S. Cl. ............................................ 521/131; 521/155
[58] Field of Search ........................................ 521/131, 155

[56] References Cited

U.S. PATENT DOCUMENTS

| | | | |
|---|---|---|---|
| 4,972,003 | 11/1990 | Grunbauer et al. | 521/131 |
| 5,439,947 | 8/1995 | Bartlett et al. | 521/131 |
| 5,532,284 | 7/1996 | Bartlett et al. | 521/134 |

*Primary Examiner*—Morton Foelak

[57] ABSTRACT

Nonflammable foam blowing agent blends of 142b or 124 are provided, as are polyol premixes and polyurethane foam compositions containing such blends.

5 Claims, No Drawings

142B/124 BLOWING AGENT BLENDS

This is a divisional of application Ser. No. 09/277,060 filed on Mar. 26, 1999 now abandoned.

BACKGROUND OF THE INVENTION

This invention relates to foam blowing agent blends of 1-chloro-1,1-difluoroethane ("142b") and 2-chloro-1,1,1,2-tetrafluoroethane ("124b"), more particularly to nonflammable blends containing up to about 70 weight % of 142b and at least about 30 weight % of 124, and to nonflammable premixes and polyurethane foam compositions containing such blends.

Until now, 142b has often been listed in patents as a potential polyurethane foam blowing agent, but its use has usually been dismissed because of its known flammability. However, with the anticipated phase-out of the leading commercial foam blowing agent, 1,1-dichloro-1-fluoroethane ("141b"), the marketplace has a need for other foam blowing agent alternatives.

BRIEF SUMMARY OF THE INVENTION

Nonflammable foam blowing agent compositions are provided, which compositions comprise up to about 70 weight % 142b and at least about 30 weight % (preferably at least about 40%, most preferably at least about 50%) of 124, as well as nonflammable foam premix compositions containing such foam blowing agent compositions.

The constitution of the premix composition depends on the percentage of 124 in the blowing agent blend. Where at least about 50% 124 is present, the foam blowing agent may be present as part of an A-side premix together with an isocyanate (preferably a polymeric methylene diisocyanate) or, preferably, as part of the B-side premix with any conventional polyol. Where at least about 40%, but less than about 50%, 124 is present in the blend, the foam blowing agent may be present as part of an A-side premix together with a polymeric methylene diisocyanate or as part of the B-side with a polyol selected from the group consisting of polyester polyols and aromatic amine based polyether polyols. Where at least about 30%, but less than about 40%, 124 is present, the blowing agent blend is preferably part of an A-side premix together with a polymeric methylene diisocyanate.

The invention is also directed toward polyurethane foam compositions which contains such foam blowing agent compositions and foam premix compositions.

DETAILED DESCRIPTION

It has now been found that 142/124 mixtures containing at least about 28–30 weight % 124 provide nonflammable blends useful as a blowing agent for polyurethane foam. Due to the close boiling points of 142b (−9° C.) and 124 (−12° C.), these blends do not tend to fractionate unlike a blend such as 142b plus chlorodifluoromethane ("22"). Furthermore, the addition of 124 to 142b has other benefits, such as lowering the ozone depletion potential and global warming potential of the blend, while increasing the solubility of the blend in polyols.

Blends containing less than 28% 124, when mixed with most polyols and isocyanates, may result in flammable mixtures in the overhead space above the premixes.

At 124 levels between about 28 and 40%, the best (nonflammability) results are obtained when the blend is premixed with a polymeric methylene diisocyanate such as Mondur 489, a polymeric methane diphenyl diisocyanate available from Bayer Corporation. At 124 levels between about 40 and 50%, a nonflammable premix alternative is a blend of the blowing agent with a polyester polyol or an aromatic amine based polyether polyol. Examples of polyester polyols are Terate 2541 and Terate 254, available from Hoechst Celanese, and PS 2502A, available from the Stepan Company. Examples of aromatic amine based polyether polyols are PL824 and V391, available from BASF Corporation and Dow Chemical Company, respectively. At 124 levels above about 50%, the blowing agent blend can be premixed with any conventional isocyanate (to form an A-side premix) or, preferably, with any conventional polyol (to form a B-side premix). Examples of other conventional polyols are glycerine based polyether polyols (such as V270, available from Dow Chemical Company) and aliphatic amine based polyether polyols (such as V800, available from Dow Chemical Company). It is also possible to split the blowing agent blend between the A-side and the B-side.

In the premix compositions, the total amount of blowing agent is typically present in a concentration range of about 2–60 weight % (preferably 10–40 weight % and most preferably about 20–30 weight %), based on the weight of the polyol or isocyanate.

In the polyurethane foam compositions, the effective concentrations of the blends are typically about 0.1–25 weight % (preferably 0.5–15%) based on the weight of the total polyurethane foam formulation.

The other components of the premix and foam formulations may be those which are conventionally used, which components and their proportions are well known to those skilled in the art. For example, catalysts and surfactants are typical components of the B-side. Some examples of typical components and mixing procedures are set forth, for example, in Research Disclosure 40137 (9/97). Also, water is frequently used as a co-blowing agent in the making of polyurethane foam.

The practice of the invention is illustrated in the following non-limiting example, using a B-side premix containing polyol, surfactant, catalyst and blowing agents. The total formulation used (which has an Iso Index of 115) is set forth in Table I, all listed materials being commercially available. In Table I, L-6900 is a silicone surfactant available from Witco Corporation and PC-8 is dimethylcyclohexylamine, a catalyst available from Air Products.

TABLE I

| Component | Parts by Weight |
| --- | --- |
| PL-824 polyol | 100 |
| L-6900 Surfactant | 1.5 |
| PC-8 Amine Catalyst | 2 |
| Water | 1.5 |
| 124 | 14.8 |
| 142b | 14.1 |
| Mondur 489 | 133 |

A foam was made from this formulation by mixing the A and B sides in an impingement mixing head, after which the mixture was dispensed into a mold.

ASTM procedure C518 was then followed to measure initial (0.134 Btu.in/ft2.hr.° F.) and aged (0.152 Btu.in/ft2.hr.° F. after two months) k-factors at 24° C. of the resultant foam, which had a density of 2.1 pounds per cubic foot.

What is claimed is:

1. A polyurethane foam composition comprising:
   (a) an A-side containing a foam premix composition comprising:
       (i) polymeric methylene diisocyante and
       (ii) a foam blowing agent comprising in an amount up to about 70 weight % 1-chloro-1,1-difluoroethane and at least about 30 weight % 2-chloro-1,1,1,2-tetrafluoroethane; and
   (b) a B-side containing a polyol.

2. A polyurethane foam composition comprising
   (a) an A-side containing polymeric methylene diisocyanate,
   (b) a B-side containing a polyol selected from the group consisting of polyester polyols and aromatic amine based polyether polyols and
   (c) a foam blowing agent comprising in an amount up to about 60 weight % 1-chloro-1,1-difluoroethane and at least about 40 weight % 2-chloro-1,1,1,2-tetrafluoroethane, said blowing agent composition being present in either the A-side or the B-side.

3. A polyurethane foam composition comprising
   (a) an A-side containing polymeric methylene diisocyanate,
   (b) a B-side containing a polyol and
   (c) a foam blowing agent comprising in an amount up to about 50 weight % 1-chloro-1,1-difluoroethane and at least about 50 weight % 2-chloro-1,1,1,2-tetrafluoroethane, said blowing agent composition being present in either the A-side or the B-side.

4. A polyurethane foam composition comprising
   (a) an A-side containing an isocyanate and
   (b) a B-side containing a foam premix composition comprising
       (i) a foam blowing agent comprising in an amount up to about 60 weight % 1-chloro-1,1-difluoroethane and at least about 40 weight % 2-chloro-1,1,1,2-tetrafluoroethane and
       (ii) a polyol selected from the group consisting of polyester polyols and aromatic amine based polyether polyols.

5. A polyurethane foam composition comprising
   (a) an A-side containing an isocyanate and
   (b) a B-side containing a foam premix composition comprising
       (i) a polyol and
       (ii) a foam blowing agent comprising in an amount up to about 50 weight % 1-chloro-1,1-difluoroethane and at least about 50 weight % 2-chloro-1,1,1,2-tetrafluoroethane.

* * * * *